United States Patent
Inoue et al.

[15] 3,671,452
[45] June 20, 1972

[54] GERMANIUM AND SILICON SUBSTITUTED MANGANESE ACTIVATED MAGNESIUM GALLATE PHOSPHOR

[72] Inventors: Taiichi Inoue; Toshimasa Ueda, both of Tokyo, Japan

[73] Assignee: Tokyo Shibaura Electric Co., Ltd., Kawasaki-shi, Japan

[22] Filed: May 4, 1970

[21] Appl. No.: 34,322

[30] Foreign Application Priority Data

May 8, 1969 Japan..................................44/35067
May 10, 1969 Japan..................................44/35643

[52] U.S. Cl..................................................252/301.4 F
[51] Int. Cl..........................................C09k 1/04, C09k 1/54
[58] Field of Search...........................252/301.4 R, 301.4 F

[56] References Cited

UNITED STATES PATENTS 3,576,757  4/1971  Brown, Jr........................252/301.4 R
3,407,325  10/1968  Brown, Jr........................252/301.4 R
3,499,843  3/1970  Brown, Jr. et al..............252/301.4 R

FOREIGN PATENTS OR APPLICATIONS 465,210  5/1950  Canada..........................252/301.4 R

*Primary Examiner*—Robert D. Edmonds
*Attorney*—Kemon, Palmer & Estabrook

[57] ABSTRACT

A method for manufacturing a phosphor material represented by the following general formula:

$$y\mathrm{MgO_2} \cdot (1-x)\mathrm{Ga_2O_3} \cdot x\mathrm{MO_2} \cdot p\mathrm{MnO}$$

where:
$\mathrm{MO_2}$ = an oxide selected from the group consisting of $\mathrm{GeO_2}$ and $\mathrm{SiO_2}$
$0 < x \leq 0.3$
$0.70 \leq y \leq 1.05$
$0.001 \leq p \leq 0.05$ which comprises subjecting a mixture of oxides having a composition expressed by the general formula to a primary firing at a temperature of from 1,100° to 1,475° C. in an oxidizing atmosphere, grinding and mixing the fired mass, and subjecting the resultant mixture to a secondary firing at a temperature of from 1,000° to 1,250° C. in a reducing atmosphere.

3 Claims, 8 Drawing Figures

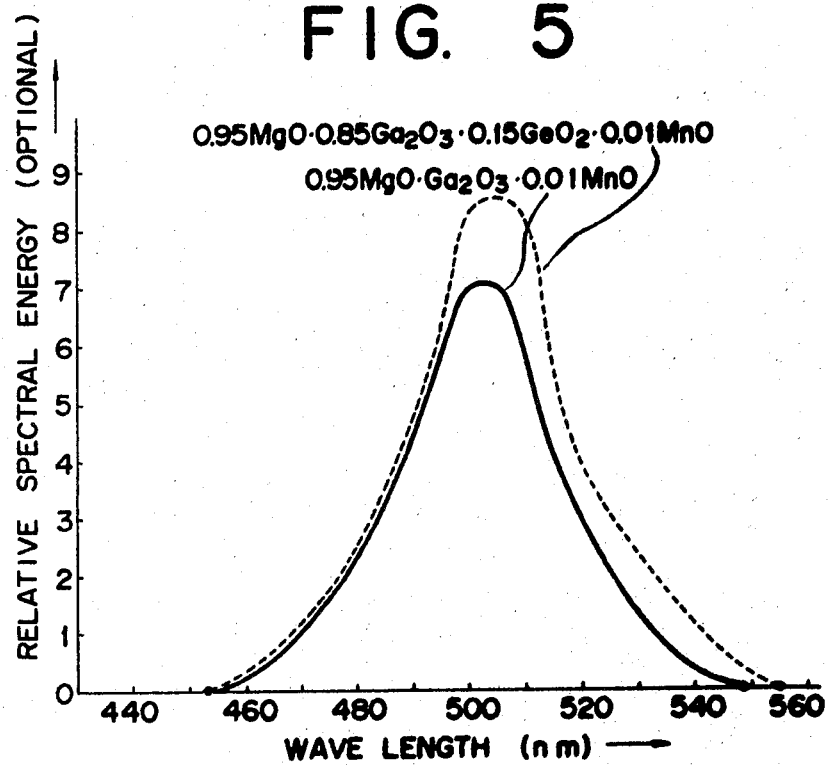
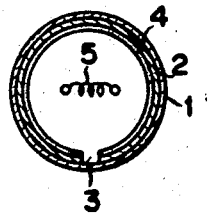

GERMANIUM AND SILICON SUBSTITUTED MANGANESE ACTIVATED MAGNESIUM GALLATE PHOSPHOR

The present invention relates to a method for producing phosphor material emitting a blue-green light. A fluorescent lamp used in electronic photography, for example, xerography is generally required to emit a blue-green light. A phosphor material giving forth such a blue-green light has heretofore consisted of manganese-activated magnesium-gallium oxides ($Mg_xGa_2OB3/Mn_y$; $y = 0.001$ to $0.05$, $x + y = 0.75$ to $1.05$). (Refer to the U.S. Pat. No. 3,407,325, British Patent 1,105,233 or West Germany Patent 1,246,914). However, this phosphor material had an insufficient efficiency and a prior art fluorescent lamp for xerography using said phosphor material only gave a low output. This led to the drawbacks that the xerography formerly required a long time of exposure, failing to prepare a large number of xerographic copies per unit time.

A phosphor material obtained by the method of the present invention comprises manganese-activated magnesium-gallium oxides, part of which is substituted by germanium dioxide or silicon dioxide as indicated by the following general formula (1):

$$yMgO \cdot (1-x)Ga_2O_3 \cdot xMO_2 \cdot pMnO \quad (1)$$

where:
$MO_2$ = an oxide selected from the group consisting of $GeO_2$ and $SiO_2$
$0 < x \leq 0.3$
$0.70 \leq y \leq 1.05$
$0.001 \leq p \leq 0.05$ The phosphor material can be prepared by first subjecting raw powders corresponding to the composition represented by the formula 1 to a primary firing in an oxidizing atmosphere, followed by grinding and mixing and then subjecting the resultant mixed powders to a secondary firing in a reducing atmosphere. Through Mn involved in the raw composition becomes tetravalent during the primary firing, it is reduced to a divalent state by the secondary firing. As a result, MnO firmly retains said divalent state and serves as an activator for the host material, consisting of $yMgO \cdot (1-x)Ga_2O_3 \cdot xMO_2$.

An object of the present invention is to provide a method for manufacturing a phosphor material giving forth a blue-green light which more effectively emits such fluorescence than the prior art type consisting of manganese-activated magnesium-gallium oxide. Another object is to offer a blue-green light emitting phosphor material which generates a greater energy output than the conventional type. Still another object is to provide a phosphor material for xerography which only requires a relatively shorter time of exposure and enables a larger number of xerographic copies to be formed per unit time than has been realized in the past. A further object to to manufacture such phosphor material displaying a high fluorescent efficiency at relatively low cost.

The further objects and advantages of the present invention will be more apparent from the following description taken by reference to the appended drawings, in which:

FIG. 5 is a curve diagram comparing the spectral energy distribution of the prior art phosphor material with that of a phosphor material according to still another example of the invention wherein the gallium is substituted by germanium dioxide;

FIG. 8 is a cross sectional view of the same.

Figure 1:
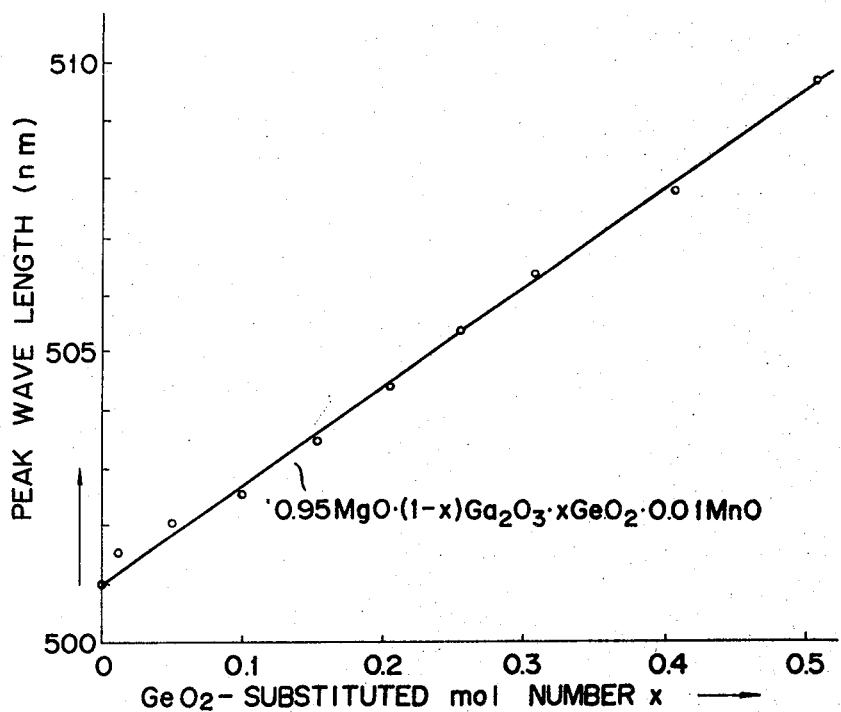
FIG. 1 is a curve diagram showing the shifts of the peak wave length in the spectral energy distributions of phosphor materials according to a series of examples of the present invention, and including some data outside the scope of the invention, in proportion to increases in the germanium-substituted mol number $x$.
Figure 2:
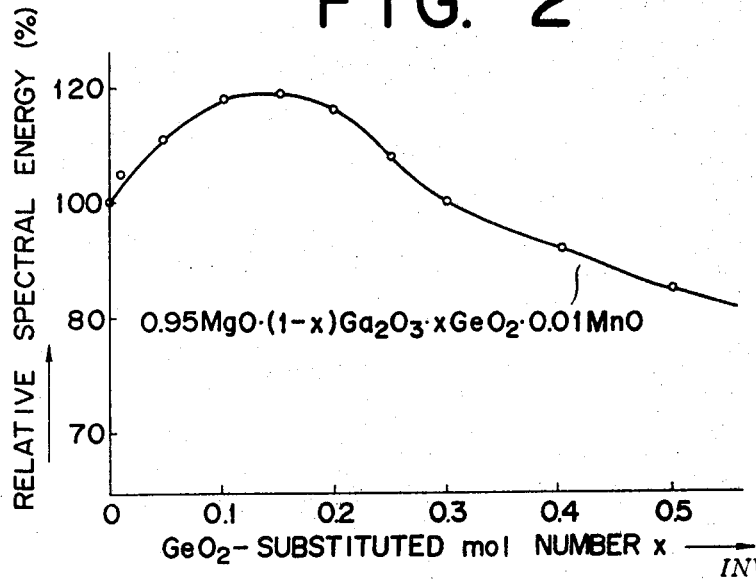
FIG. 2 is a curve diagram showing variations in the relative intensity of the spectral energy of the phosphor material according to increases in the value of $x$ in FIG. 1.

There will now be described by reference to FIGS. 1 to 4 the relationship between the proportions of the components constituting the phosphor material of the present invention and its light-emitting properties. FIG. 1 relates to a phosphor material wherein the term $MO_2$ of the aforementioned formula 1 consists of $GeO_2$ and shows variations in the peak wave length of the spectral energy of said material, where $y$ is fixed at 0.95, $p$ at 0.01 and $x$ denotes a variable. As apparent from this figure, when the mol number $x$ of gallium substituted by germanium increases, then the peak wave length is gradually shifted toward the long wave side. However, where $x$ ranges between 0 and 0.3, then said shift only amounts to about 5.5 nm, presenting no practical difficulties. And the peak wave length lies between 501 nm and 506.5 nm, enabling the emission of a good blue-green light. FIG. 2 shows variations in the relative intensity of the spectral energy of FIG. 1, where the spectral energy of the prior art phosphor material ($x = 0$) is taken as 100 and $x$ is considered as a variant. As seen from this figure, in case of $0 < x \leq 0.3$, the phosphor material of the present invention gives a larger output than the conventional type. Particularly where $x$ lies between 0.1 and 0.2, the present phosphor material generates a prominently greater or about 20 percent larger energy output. There have been described the properties of a phosphor material according to the present invention where $y$ and $p$ amount to 0.95 and 0.01 respectively. Still in case of $0.98 \geq y \geq 0.92$ and $0.02 \geq p \geq 0.005$, said properties do not substantially vary. Further in case of $1.05 \geq y \geq 0.98$, $0.92 \geq y \geq 0.70$ and $0.05 \geq p \geq 0.02$, $0.005 \geq p \geq 0.001$, said properties even display a better effect than has been possible in the past, though they decrease from those associated with the aforementioned optimum range. If however, $y$ lies outside of the range between 0.70 and 1.05 and $p$ departs from the limit of 0.001 to 0.05, then the phosphor material of the present invention varies little from the prior art product in effect. Particularly when $p$ exceeds 0.05, the phosphor material bears a foreign color harmfully affecting its properties.

Figure 4:
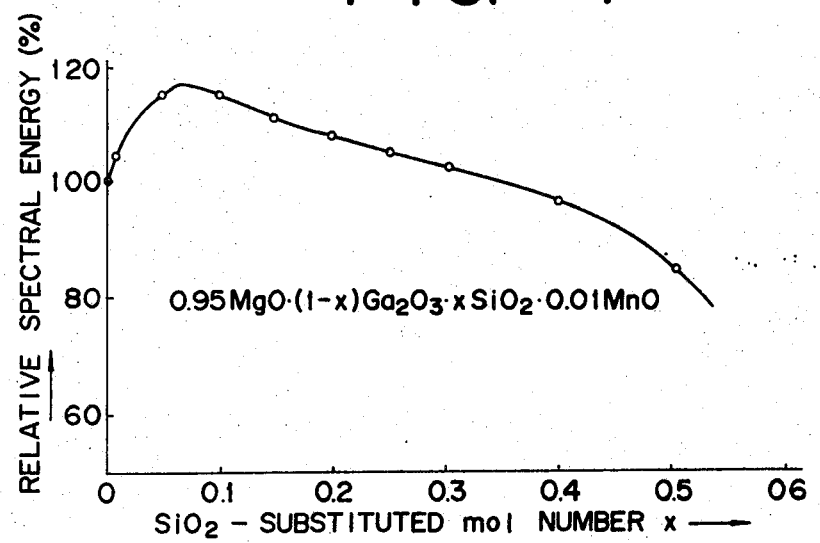
FIG. 4 is a curve diagram showing changes in the relative intensity of the spectral energy of the phosphor material of FIG. 3 according to variations in the value of $x$.
Figure 3:
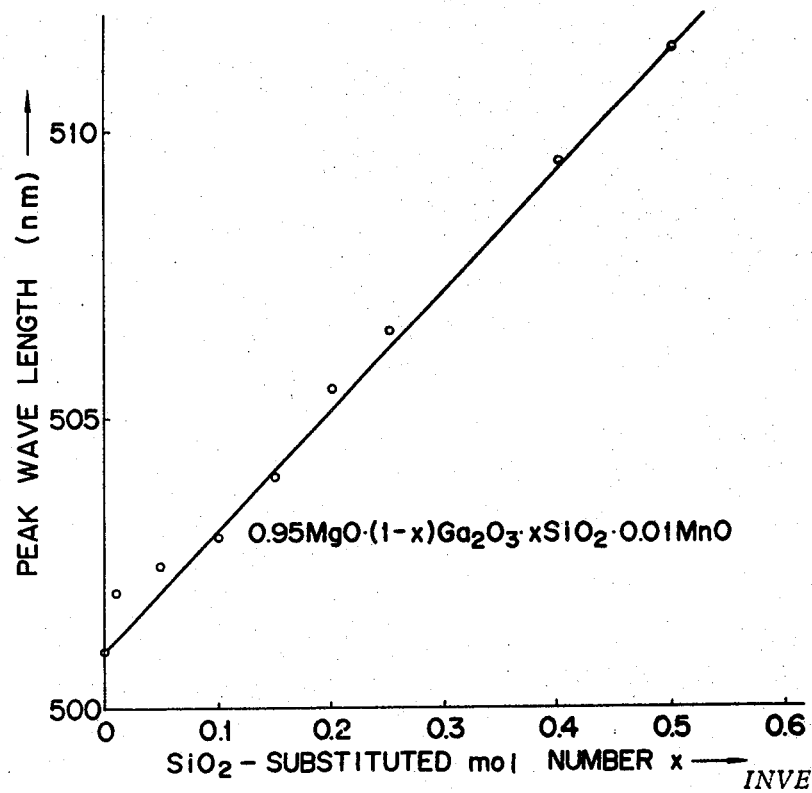
FIG. 3 is a curve diagram showing the shifts of the peak wave lengths in the spectral energy distributions of a phosphor materials according to another series of examples of the invention, and including some data outside the scope of the invention, in proportion to increases in the silicon-substituted mol number $x$.

FIG. 3 represents variations in the peak wave length (nm) of the spectral energy of the phosphor material of the present invention, where $MO_2$ of the aforementioned equation 1 is represented by $SiO_2$, $y$ is fixed at 0.95, $p$ at 0.01 and $x$ is varied. As apparent from this figure, when the gallium is substituted by silicon in increasing mol members, a peak wave length in the spectral energy distribution is gradually shifted toward the long wave side. However, where the value of $x$ ranges between 0 and 0.3, said shift only amounts to 6.0 nm, presenting no practical difficulties but permitting the emission of a good blue-green light. FIG. 4 indicates variations in the relative intensity of the spectral energy of the phosphor material of FIG. 3, where the spectral energy of the prior art phosphor material is taken as 100 and $x$ is considered as a variant. The figure shows that in case of $0 < x \leq 0.3$, the phosphor material of the present invention generates a larger output than the conventional product, and particularly in case $x$ lies between 0.05 and 0.1, said output increases about 15 percent over the level which has been possible in the past. There have been described the properties of a phosphor material according to the present invention, where $y$ denotes 0.95 and $p$ 0.01. Still in case of $0.98 \geq y \geq 0.92$ and $0.02 \geq p \geq 0.005$, said properties vary little. Further in case of $1.05 \geq y \geq 0.98$, $0.92 \geq y \geq 0.70$ and $0.05 \geq p \geq 0.02$, $0.005 \geq p \geq 0.001$, the properties even display a better effect than has been realized in the past, though they decrease from those associated with the aforesaid optimum range. If, however, y lies outside of the range between 0.70 and 1.05 and p departs from the limit of 0.001 to 0.05, then the phosphor material of the present invention varies little from the prior art product in effect. Particularly when y falls from 0.70, the phosphor material decreases in resistance to heating in the air, so that its fluorescent efficiency is undesirably reduced when the material is fired during the process of manufacturing a fluorescent lamp. Further, when p exceeds 0.05, the phosphor material itself bears a foreign color harmfully affecting its properties. It will be noted that the case where part of the gallium oxide is substituted by both $GeO_2$ and $SiO_2$, it is still deemed a modification of the present invention.

The present invention will be more clearly understood from the following example. There were prepared samples of a phosphor material consisting of manganese-activated oxides of magnesium, gallium and germanium expressed by a chemical formula $yMgO \cdot (1-x)Ga_2O_3 \cdot xGeO_3 \cdot MnO$ where y is fixed at 0.95 and p at 0.01 and x is varied as listed in Table 1 below. There was further prepared another set of samples consisting of manganese-activated oxides of magnesium, gallium and silicon expressed by a chemical formula $yMgO \cdot (1-x)Ga_2O_3 \cdot xSiO_2 \cdot MnO$ where y is fixed at 0.95 and p at 0.01 and x is varied as given in Table 2 below. It will be noted that samples Nos. 1 and 11 are included in Tables 1 and 2 respectively as referential samples representing the same type as the prior art phosphor material and Nos. 9, 10, 19 and 20 denote referential samples outside of the scope of the present invention wherein x is greater than 0.3 mol.

phosphor materials. (The secondary firing of all samples Nos. 1 to 20 may be conducted at temperatures of 1,000° to 1,250° C.) The reducing atmosphere consisted of a mixture of 1 percent by volume of hydrogen and 99 percent by volume of nitrogen.

FIG. 2 represents the relative intensity of the spectral energy of samples Nos. 1 to 10 excited by ultraviolet rays of 253.7 nm with that of the prior art product taken as 100. Further, determination was made of the spectral energy distribution of samples Nos. 1 to 10 when they were excited similarly by ultraviolet rays of 253.7 nm. FIG. 5 indicates the spectral energy distributions of samples No. 1 (used as reference) and No. 5 which were considered as typical specimens. As seen from FIG. 5, a phosphor material according to the present invention emits a spectral energy approximately 20 percent larger than the prior art product, and the emission peak of the latter has the almost same wave length as that of the former (thereby emitting blue-green light).

Where there is generally manufactured a fluorescent lamp, the inside wall surface of the glass bulb is coated with a phosphor material, and firing is conducted at a temperature of 550° C. to expel the organic binder contained in said material. At this time, the brightness of the phosphor material slightly falls. To study the extent of said fall, there was conducted another test in which 5 g of each sample of a phosphor material was placed in a quartz dish, followed by heating 30 minutes in the air at a temperature of 550° C. The test shows that as apparent from table 3 below, the brightness decreases of the phosphor materials of the present invention are practically equal to that of the prior art product considering the experimental error.

TABLE 1

| Sample number | X | Proportions mixed | | | | Primary firing | | Secondary firing | |
|---|---|---|---|---|---|---|---|---|---|
| | | MgO (g.) | $Ga_2O_3$ (g.) | $GeO_2$ (g.) | $MnCO_3$ (g.) | Temp. (° C.) | Time (h.) | Temp. (° C.) | Time (h.) |
| 1 | 0 | 3.830 | 18.744 | 0 | 0.115 | 1,400 | 15.0 | 1,150 | 1 |
| 2 | 0.01 | 3.830 | 18.557 | 0.105 | 0.115 | 1,425 | 15.0 | 1,150 | 1 |
| 3 | 0.05 | 3.830 | 17.807 | 0.523 | 0.115 | 1,425 | 17.5 | 1,150 | 1 |
| 4 | 0.1 | 3.830 | 16.870 | 1.046 | 0.115 | 1,425 | 20.0 | 1,150 | 1 |
| 5 | 0.15 | 3.830 | 15.932 | 1.569 | 0.115 | 1,450 | 15.0 | 1,200 | 1 |
| 6 | 0.2 | 3.830 | 14.995 | 2.092 | 0.115 | 1,450 | 17.5 | 1,200 | 1 |
| 7 | 0.25 | 3.830 | 14.058 | 2.616 | 0.115 | 1,450 | 20.0 | 1,200 | 1 |
| 8 | 0.3 | 3.830 | 13.121 | 3.138 | 0.115 | 1,475 | 15.0 | 1,250 | 1 |
| 9 | 0.4 | 3.830 | 11.246 | 4.184 | 0.115 | 1,475 | 17.5 | 1,250 | 1 |
| 10 | 0.5 | 3.830 | 9.372 | 5.230 | 0.115 | 1,475 | 20.0 | 1,250 | 1 |

TABLE 2

| Sample number | X | Proportions mixed | | | | Primary firing | | Secondary firing | |
|---|---|---|---|---|---|---|---|---|---|
| | | MgO (g.) | $Ga_2O_3$ (g.) | $SiO_2$ (g.) | $MnCO_3$ (g.) | Temp. (° C.) | Time (h.) | Temp. (° C.) | Time (h.) |
| 11 | 0 | 3.830 | 18.744 | 0 | 0.115 | 1,400 | 15 | 1,150 | 1 |
| 12 | 0.01 | 3.830 | 18.557 | 0.060 | 0.115 | 1,400 | 15 | 1,150 | 1 |
| 13 | 0.05 | 3.830 | 17.807 | 0.300 | 0.115 | 1,350 | 15 | 1,150 | 1 |
| 14 | 0.1 | 3.830 | 16.870 | 0.601 | 0.115 | 1,300 | 18 | 1,100 | 1 |
| 15 | 0.15 | 3.830 | 15.932 | 0.901 | 0.115 | 1,270 | 18 | 1,100 | 1 |
| 16 | 0.2 | 3.830 | 14.995 | 1.201 | 0.115 | 1,230 | 18 | 1,100 | 1 |
| 17 | 0.25 | 3.830 | 14.058 | 1.502 | 0.115 | 1,200 | 20 | 1,050 | 1 |
| 18 | 0.3 | 3.830 | 13.121 | 1.802 | 0.115 | 1,180 | 20 | 1,050 | 1 |
| 19 | 0.4 | 3.830 | 11.246 | 2.402 | 0.115 | 1,150 | 20 | 1,050 | 1 |
| 20 | 0.5 | 3.830 | 9.372 | 3.003 | 0.115 | 1,100 | 20 | 1,000 | 1 |

Samples Nos. 1 to 20 were prepared by weighing out the sufficient amounts of raw powdered materials to produce component oxides having the proportions indicated in Tables 1 and 2, followed by full mixing. Each mixture was placed in a 50 cc uncovered quartz crucible and subjected to a primary firing in the air. The primary firing was carried out with time and temperature varied according to the value of x, namely, as shown in Tables 1 and 2. The fired mixture was gently ground in a mortar, and sieved by a 270-mesh nylon screen. The mass was again received in a 50 cc uncovered quartz crucible, fired 1 hour in a reducing atmosphere by heating to 1,150° to 1,250° C. for samples Nos. 1 to 10 and 1,000° to 1,150° C. for samples Nos. 11 to 20, and thereafter cooled to room temperature in the same atmosphere, obtaining a variety of

TABLE 3

| Samples of phosphor material | X | Rate of decrease (%) |
|---|---|---|
| No. 1 | 0 | 22 |
| No. 3 | 0.05 | 21 |
| No. 4 | 0.10 | 23 |
| No. 5 | 0.15 | 20 |
| No. 6 | 0.20 | 24 |
| No. 8 | 0.30 | 21 |

Figure 6:
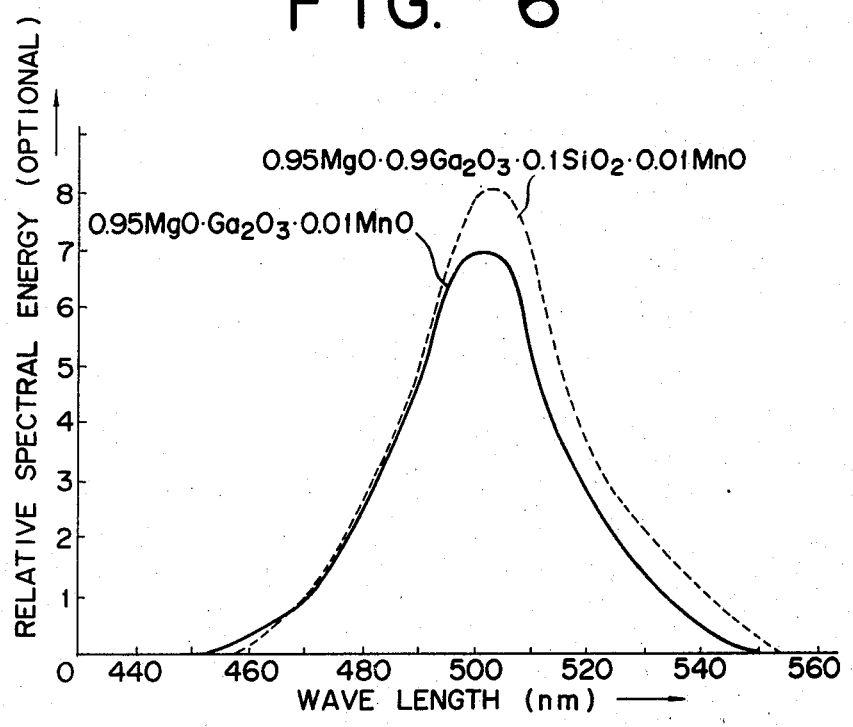
FIG. 6 is a curve diagram comparing the spectral energy distribution of a phosphor material wherein the gallium is partly substituted by silicon dioxide according to a further example of the invention, with that of the prior art type.

FIG. 4 represents the relative intensity of the spectral energy of samples Nos. 11 to 20 excited by ultra-violet rays of 253.7 nm with the spectral energy of the prior art product taken as 100. Further, determination was made of the spectral energy distribution of said samples similarly excited by ultraviolet rays. FIG. 6 shows the spectral energy distributions of samples No. 11 ($x = 0$, used as reference) and No. 14 which were considered as typical specimens. As apparent from FIG. 6, a phosphor material according to the present invention emits an approximately 15 percent larger spectral energy than the prior art product, and the emission peak of the latter has the almost same wave length as that of the former (thereby emitting blue-green light).

Where there is generally manufactured a fluorescent lamp, the inner wall surface of the glass envelope is coated with a phosphor material, and firing is conducted at a temperature of 550° C. to expel the organic binder contained in said material. At this time, the brightness of the phosphor material slightly falls. To study the extent of said fall, there was carried out another test in which there was placed 5 g of each sample of a phosphor material in a quartz dish, followed by heating 30 minutes in the air at a temperature of 550° C. The test shows that as seen from table 4 below, the brightness decreases of the phosphor materials of the present invention are smaller by 4 to 7 percent than that of the conventional product.

TABLE 4

| Samples of phosphor material | x | Rate of decrease (%) |
|---|---|---|
| No. 11 | 0 | 22 |
| No. 12 | 0.01 | 18 |
| No. 13 | 0.05 | 17 |
| No. 14 | 0.1 | 17 |
| No. 15 | 0.15 | 18 |
| No. 16 | 0.20 | 16 |
| No. 17 | 0.25 | 16 |
| No. 18 | 0.30 | 15 |
| No. 19 | 0.40 | 15 |
| No. 20 | 0.50 | 14 |

Figure 7:
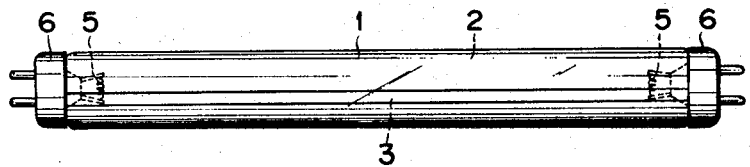
FIG. 7 is a front elevation of a fluorescent lamp using the phosphor material of the invention adapted for xerography.

There will now be described by reference to FIGS. 7 and 8 a fluorescent lamp for xerography applying a phosphor material according to the present invention. A cylindrical glass envelope 1 being open at both ends and having 485 mm length and 24 mm in outside diameter is provided. The inside wall surface of the envelope 1 is coated with a suspension prepared by suspending titanium dioxide in a solution of nitrocellulose in butyl acetate. After drying, the coating is fired about 5 minutes at a temperature of about 550° C. to form a reflection layer 2 only consisting of titanium dioxide. The reflection layer is scraped off 8 mm width along the longitudinal direction of the envelope 1 to form a narrow-transparent region or window 3. The reflection layer 2 is again coated with a suspension prepared by suspending a phosphor material according to the present invention in a solution of nitrocellulose in butyl acetate. After drying the coating, firing is conducted about 5 minutes at a temperature of 550° C. to form a a fluorescent layer 4. In this case, the phosphor material deposited on the narrow-transparent region 3 is fully removed as shown in FIG. 8. The subsequent steps are performed in the same method as used in manufacturing a general fluorescent lamp. Thus, electrodes 5 are fixed at the inside of both ends of the envelope 1, followed by evacuation; a small amount of mercury and argon gas are put into the envelope 1; the envelope 1 is sealed; and then finally bases 6 are fixed at the outside of both ends of the envelope 1, obtaining a 30-watt florescent lamp.

Determination was made of the relative energy outputs of light emitted through the each transparent region 3 of two kinds of fluorescent lamps using phosphor materials containing germanium dioxide and silicon dioxide respectively in comparison with that generated by the prior art lamp.

| Type of fluorescent lamp | Relative output |
|---|---|
| According to the present invention (containing GeO$_2$) | 240 |
| According to the present invention (containing SiO$_2$) | 240 |
| According to the prior art | 200 |

As seen from the above data, the relative light outputs of fluorescent lamps applying a phosphor material according to the present invention are about 20 percent greater than the conventional type. On the lamp applied the phosphor material containing germanium dioxide, the improved output is attributed to 20 percent output increase of the phosphor material itself. In silicon dioxide, it is attributed to both 15 percent output increase by reduction of the output deterioration which unavoidably occurs in the manufacture of a fluorescent lamp.

The foregoing example relates to the case where a phosphor material according to the present invention was used in a fluorescent lamp for xerography. It will be apparent, however, that the phosphor material of the present invention is not limited to such use, but is applicable to other fluorescent lamps giving forth a blue-green light, for example, those for ornamental purposes or to a general fluorescent lamp for lighting purposes as an additional green light component by being incorporated with other phosphor materials.

As mentioned above, the phosphor material of the present invention exhibits a larger energy output than the same type of the prior art substantially without changing the color of a generated light and elevates the output of the resultant fluorescent lamp to an extent of about 20 percent and has the additional advantage that partial substitution of extremely expensive gallium (Ga) by germanium (Ge) or silicon (Si) enables said phosphor material to be manufactured at low cost.

What we claim is:

1. A blue-green light emitting magnesium gallate phosphor material of the formula:

$$yMgO \cdot (1-x)Ga_2O_3 \cdot xMO_2 \cdot pMnO$$

where:

MO$_2$ is an oxide selected from the group consist of GeO$_2$ and SiO$_2$, $0.1 \leq x \leq 0.3$, $0.70 \leq y \leq 1.05$ and $0.001 \leq p \leq 0.05$.

2. A phosphor material of claim 1 wherein y lies between 0.92 and 0.98 and p lies between 0.02 and 0.005.

3. A phosphor material of claim 2 wherein $y = 0.95$ and $p = 0.01$.

* * * * *